3,208,969
VINYL HALIDE RESINS STABILIZED WITH DI-ORGANO TIN AROMATIC DIMERCAPTO COMPOUNDS
William M. Quattlebaum, Jr., and James E. Hardwicke, Columbia, S.C., assignors to Cardinal Chemical Company, a limited partnership of South Carolina
No Drawing. Filed Jan. 29, 1964, Ser. No. 341,086
5 Claims. (Cl. 260—45.75)

This application is a continuation-in-part of co-pending application Serial No. 173,324, filed February 15, 1962, now abandoned.

This invention relates to a novel class of diorganotin dimercaptides and to a method of preparing such compounds, which compounds are useful for the stabilization of halogenated vinyl resins.

Many types of organotin compounds have been used in the past for the stabilization of halogenated vinyl resins the most important of which are the polymers and copolymers of vinyl chloride. In recent years, organotin mercaptides have gained prominence in the stabilization of such resins, but they have certain disadvantages which limit their usefulness. Most of the organotin mercaptides heretofore known develop an objectionable mercaptan odor during compounding operations and when used in effective concentrations, they often adversely affect the physical properties of the stabilized halogenated resin—i.e., they may increase the resin's water absorption, brittleness and/or plasticity.

It is an object of this invention to provide a new class of diorganotin dimercaptides. By avoiding reaction of the organotin oxide with a carboxyl group, lower water absorption of the resin composition can be achieved. It is another object of this invention to provide a novel method of making such compounds. It is still another object of this invention to provide halogenated compositions containing such compounds which possess exceptionally good long-term high temperature stability. A further object of this invention is to provide a stabilizer for halogenated resins which will be efficacious in very low concentrations and which will not adversely affect the physical properties of the resin.

These and other objects are accomplished by the practice of this invention which, briefly, comprises providing a diorgano tetravalent tin dimercaptide of a polymercapto compound having the formula

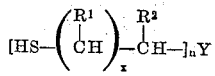

wherein $n$ is a whole integer from 2 to 4, $x$ has a value of from 0 to 1; Y is a member selected from the group consisting of an aromatic hydrocarbon radical, an alkoxy substituted aromatic hydrocarbon radical and a halogenated aromatic hydrocarbon radical, each of said

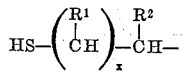

groups being attached to a nuclear carbon atom of said Y radical, $R^1$ and $R^2$ are members selected from the group consisting of hydrogen and alkyl radicals containing from 1 to 18 carbon atoms and the total of $R^1$ and $R^2$ does not exceed 20 carbon atoms. Such compounds may be prepared by reacting a polymercapto compound having the above formula, or a salt thereof, with a compound selected from the group consisting of

and

wherein Z is a member selected from the group consisting of oxygen and sulfur, each X is a member selected from the group consisting of an alkoxy group and an anion and each R is a member selected from the group consisting of hydrocarbon radicals containing 1 to 18 carbon atoms, furfuryl and tetrahydrofurfuryl.

As examples of the various radicals in the above formulas, the radical

may be, for example, methylene (when $x$ equals 0 and $R^2$ is hydrogen), ethylene (when $x$ is 1 and $R^1$ and $R^2$ are both hydrogen), isoamylidene, isobutylene, 1-butylethylene, etc. Y may be either an aromatic hydrocarbon radical, an alkoxy substituted aromatic hydrocarbon radical or a halogenated aromatic hydrocarbon radical to which mercaptoalkyl groups are attached to nuclear carbon atoms in the aromatic ring. The radical may be, for example, the radical obtained by the removal of $n$ hydrogen atoms from $n$ nuclear carbon atoms of benzene, p-chlorotoluene, naphthalene, 2-bromonaphthalene, p-xylene, 1-fluoro-naphthalene, 1,4-dichlorobenzene, 1,2,4-trichlorobenzene, o-xylene, m-xylene, toluene, mesitylene, ethylbenzene, resorcinol dimethyl or diethyl ether, cresyl ethers, catechol dimethyl or diethyl ethers, etc. The salts of the polymercapto compounds include the alkali salts and alkaline earth metal salts which may be represented by the formula

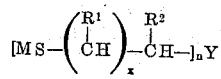

wherein, Y, $R^1$, $R^2$, $x$ and $n$ are the same as defined above and M is a cation such as ammonium, sodium, potassium, lithium, calcium, magnesium, etc.

As examples of groups on the diorganotin reactant, R may be alkyl (e.g., methyl, ethyl, butyl, isobutyl, octyl, dodecyl, etc.), aryl (e.g., phenyl, or naphthyl), aralkyl (e.g., phenylmethyl), alkaryl (e.g., tolyl or xylyl), cycloaliphatic (e.g., cyclohexyl), unsaturated aliphatic (e.g., 2-butenyl); or it may be a heterocyclic radical such as furfuryl or tetrahydrofurfuryl. Each radical X may be an alkoxy group, such as methoxy, ethoxy, propoxy, butoxy or other lower alkoxy groups, or an anion, for example hydroxy, halide (such as chloride, bromide, iodide or fluoride), or a carboxylic acid group (such as acetate, propionate, benzoate or radicals of other carboxylic acids, preferably containing no more than 12 carbon atoms).

The products of this invention are diorgano tetravalent tin dimercaptides of polymercapto compounds having the formula

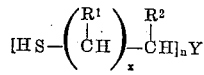

in which $R^1$, $R^2$, $x$, $n$ and Y are the same as defined above. Since the novel diorganotin dimercaptides of this invention are prepared by the reaction of two polyfunctional reactants, the resultant products are primarily polymeric. However, some cyclic monomeric material may also be obtained. Thus, in a preferred embodiment of this invention, when $n$ in the above formula is 2 the product is primarily a linear polymeric diorganotin dimercaptide which consists essentially of recurring units having the formula

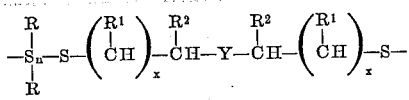

wherein R, $R^1$, $R^2$, $x$ and Y are as defined above.

The nature of the end groups does not appreciably affect the efficacy of the polymeric products covered by our invention. As is well known in the chemistry of condensation polymers (cf. polyesters, polyamides, etc.), the end groups consist of a radical formed from one or the other of the two reactants or of a chain-stopping monofunctional group. If an excess of mercaptan is employed, the terminal groups may be entirely —SH groups. If an excess of the dialkyltin halide, oxide or hydroxide is employed, the terminal groups may consist entirely of hydroxy groups. A small amount of a monomercaptan such as lauryl mercaptan acts as a chain stopping group, and gives a less viscous product without affecting the efficacy of the stabilizer. If the dialkyltin salt employed contains some trialkyltin salt, the polymeric tin mercaptide may contain trialkyltin terminal groups. The presence of such trialkyltin derivatives also serves to lower the viscosity of the product.

The products of this invention may also contain some cyclic material which corresponds to the general formula

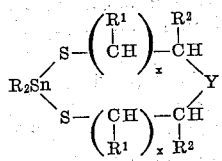

wherein R, $R^1$, $R^2$, $x$ and Y are the same as defined above. When there are three or four reactive mercapto groups on the polymercapto reactant, the resultant diorgano tetravalent tin dimercaptide may be a cross-linked polymeric product.

In a preferred embodiment of this invention the polymercapto compound has two mercaptomethyl groups substituted on a single aromatic ring. Such compounds may be represented by the formula

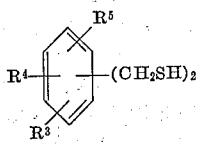

in which each of $R^3$, $R^4$ and $R^5$ may be hydrogen, (lower) alkyl (e.g., methyl, ethyl, propyl, butyl, etc.), (lower) alkoxy (e.g., methoxy, propoxy, etc.) or halogen (e.g., chlorine, bromine, etc.). The resultant dialkyl tetravalent tin dimercaptide comprises a linear polymeric diorganotin dimercaptide which consists essentially of recurring units having the formula

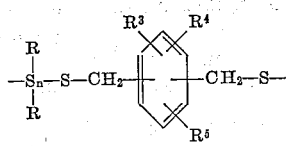

in which R, $R^3$, $R^4$ and $R^5$ are as described above.

Several procedures may be used for reacting the organotin compound with the polymercapto compound. For example, a diorganotin dihalide may be reacted with an alkali metal salt of the polymercapto compound. Another procedure involves the reaction of a diorganotin oxide, dihydroxide or dialkoxide with the polymercapto compound. Still another procedure involves the reaction of a diorganotin dihalide with the polymercapto compound followed by the addition of a hydrogen ion acceptor such as an alkali metal hydroxide or carbonate (e.g., sodium hydroxide, sodium carbonate, potassium hydroxide, potassium carbonate, lithium hydroxide, etc.).

The particular conditions under which the polymercapto compound and diorganotin compound are reacted are not critical. An excess of the stoichiometric amount of either reactant may be used since the desired diorganotin mercaptide will be formed and an excess of one or the other reactant sometimes exerts a beneficial rather than a harmful effect upon the performance of the stabilizer. As a matter of economy, and for best performance, a small excess (1 to 5%) of the polymercapto compound is generally used to insure complete reaction of all of the more expensive diorganotin compound. The reaction will proceed at room temperature or below, although it may be hastened by heating. It is preferred not to heat the reactants above about 200° C. The reaction may be conducted in the presence of an inert solvent such as toluene or benzene although the use of a solvent is not necessary. The products, which may be viscous liquids or solids, may be recovered by conventional methods such as by filtration (if it precipitates as a solid) or, when a solvent is used, by evaporation of the solvent.

During the reaction of the polymercapto compound and the diorganotin compound, the extent of polymerization may be controlled by incorporating with the polymercapto compound up to about 10 mole percent, and preferably about 5 mole percent, based on the moles of polymercapto compound, of a chain stopping agent having the formula $R^6SH$ in which $R^6$ is a monovalent hydrocarbon radical or halogenated hydrocarbon radial containing from 1 to 18 carbon atoms such as alkyl, aryl, alkaryl or aralkyl. Examples of chain stopping agents which may be used are laurylmercaptan and chlorobenzylmercaptan. Where odor can be tolerated, benzyl mercaptan may be used. The use of a small amount of such monomercapto compounds lowers the viscosity of the final product to the extent that it will usually not solidify and can be poured at room temperature. However, the product is still of sufficiently high molecular weight to be relatively non-volatile.

The novel compounds provided in accordance with the practice of this invention are powerful stabilizers for halogenated resins and may be used in much lower concentrations than are required for most of the conventional tin mercaptide stabilizers. Therefore, the physical characteristics of the halogenated resin other than stability, such as brittleness, plasticity and water absorption, are less affected than with most other stabilizers. Halogenated resins stabilized with the diorganotin dimercaptides of this invention are usually resistant to damaging color development at elevated temperatures for a much longer period of time than such resins containing an equivalent amount of most stabilizers heretofore known. These diorganotin dimercaptides are effective antioxidants as well as heat stabilizers and prevent degradation of the halogenated resin. Moreover, the diorganotin dimercaptides of this invention are relatively odorless under processing temperatures as high as 400° F. or above, and are not as objectionable to work with as are many of the heretofore available mercaptide stabilizers. Even after one —SH group is released by reaction with HCl, the other S atom remains attached to tin, and the mercaptan cannot escape to the air. The compounds of this invention are more powerful stabilizers of halogenated resins and/or possess less objectionable odor than, for example, compounds obtained by reacting a diorganotin compound with mercapto compounds which do not come within the above definition of polymercapto compounds. Thus, diorganotin dimercaptides obtained, for example, by reacting equimolar amounts of dibutyl tin oxide with dimercapto compounds, such as

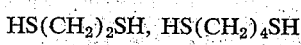

etc. are not as effective as stabilizers for halogenated resins as are the compounds of this invention. The diorganotin mercaptides of this invention may be either cyclic or polymeric in structure.

It cannot be emphasized too strongly that one of the major parts of this invention is the discovery of mercaptans having a structure similar to that of benzyl mercaptan, but which are relatively odorless by comparison with benzyl mercaptan. This is of great importance commercially where the benzyl mercaptides of tin have been ruled out by their intense and nauseating odor.

Halogen containing resins which may be stabilized with the diorganotin mercaptides of this invention include the polyvinyl halide resins, such as polyvinyl chloride, as well as vinyl halide copolymers such as a copolymer of 95 to 5% vinyl chloride and from 5 to 95% of vinyl acetate. Blends of halogenated resins with non-halogenated resins such as compositions containing 10 to 90% by weight of polyvinyl chloride and from 90 to 10% by weight of a copolymer of butadiene, acrylonitrile and sytrene, may also be stabilized with these compounds.

The amount of diorganotin dimercaptides required to stabilize the resin, generally varies from about 0.1 to 5% by weight of the resin; usually 1 to 2% by weight is preferred. Small amounts of other organotin stabilizers, such as organotin maleates and conventional organotin mercaptides may be used in conjunction with the diorganotin dimercaptides of this invention to stabilize halogenated resins. For example, a polyvinyl chloride resin may be stabilized with a mixture comprising about 95% of dibutyltin xylene α,α'-dimercaptide and about 5% of dibutyltin dilauryl mercaptide. Such a mixture is a liquid, and therefore easier to work with than the highly viscous, dibutyltin xylene α,α'-dimercaptide, a product which solidifies at room temperature.

The following examples illustrate the best methods found for carrying out this invention. All parts are by weight.

EXAMPLE 1

Into a reaction vessel there are charged α,α'-dimercapto-p-xylene (17.0 parts) and dibutyltin oxide (24.9 parts). (α,α'-Dimercapto-p-xylene has the formula

and may also be called 1,4-dimercaptomethylbenzene.) The liquid mixture is heated to 140° C. with stirring during a period of 15 minutes and is then transferred to a vacuum flask and heated for an additional 10 minutes at 135° C. under a vacuum of 10 mm. Hg. Dibutyltin p-xylene α,α'-dimercaptide remains as a viscous liquid which solidifies on standing. Percent sulfur: calculated 15.96; found 15.9. Percent tin: calculated 29.6; found 29.4.

EXAMPLE 2

To a reaction flask fitted with a stirrer and distilling assembly there are charged α,α'-dimercapto-p-xylene (329.0 parts) and lauryl mercaptan (26.6 parts). To this mixture of mercaptans are added toluene (1345 parts) and water (682 parts). Then sodium hydroxide (320 parts of a 50% aqueous solution) is added dropwise with stirring over a 15 minute period. To this mixture, dibutyltin dichloride (607.6 parts) is added in a slow stream. The reaction is exothermic and is maintained at reflux by the rate of addition of the dichloride and by external cooling. After digesting for 30 minutes, the bottom brine layer is removed and the top organic layer is stripped of toluene. The reaction product remains as an oil of moderate viscosity. Percent sulfur: calculated 15.67; found 15.5.

EXAMPLE 3

To a vessel are charged dioctyltin oxide (36 parts) and toluene (36 parts). There is then added α,α'-dimercapto-p-xylene (17 parts) and the mixture is heated until a temperature of 130–140° C. is reached. This requires 15 minutes. The solvent is removed by heating to 170° C. Dioctyltin p-xylene α,α'-dimercaptide remains as an oil.

EXAMPLE 4

Into a round bottom vessel fitted with a stirrer and distilling assembly are placed water (2046 parts), benzene (4100 parts) and α,α'-dimercapto p-xylene (1020 parts). The mixture is agitated and sodium hydroxide (912 parts of a 50% aqueous solution) is added in a slow stream over a 10 to 15 minute period. To the stirred reaction mixture, there is added over a 20 minute period dibutyltin dichloride (1822 parts). The reaction is highly exothermic and some external cooling is required. The rate of addition of the dichloride and the amount of external cooling are adjusted so that a gentle refluxing of the benzene is maintained during most of the addition. When the addition is completed, the stirred mixture is held at reflux for thirty minutes. The bottom brine layer is then drawn off and 50% aqueous sodium hydroxide solution (48 parts) is added to the upper layer. The mixture is azeotropically dried, cooled to 30° C. and filtered through a Buchner funnel coated with Hi-Flo to remove salt and other solids. The benzene is then removed by distilling under vacuum, eventually raising the temperature to 130° C. at a pressure of 10 mm. The product is a viscous liquid which solidifies on standing. Percent sulfur: calculated 15.96; found 15.8. Percent tin: calculated 29.6; found 29.5.

EXAMPLE 5

The procedure of Example 4 is repeated with the sole exception that 5% by weight of the product obtained in Example 4 of dibutyltin dilauryl mercaptide is added to the product of Example 4 before it solidifies. The resultant composition is a permanently liquid product and is extremely effective in the stabilization of polyvinyl chloride resins.

EXAMPLE 6

This example illustrates the efficacy of one of the diorganotin dimercaptides of this invention as a stabilizing agent for a vinyl chloride homopolymer and compares it to other diorganotin mercaptides.

Five separate batches of stabilized Geon 103 EP resin (a medium molecular weight polyvinyl chloride resin) are prepared, each batch being stabilized with a different dibutyltin dimercaptide. Each batch is prepared by adding 1 part of a different dibutyltin dimercaptide to 49 parts of the resin. Each composition is then milled on a hot roll mill (110 lbs. steam pressure) for 5 minutes to obtain a clear, thin sheet. A ¾ inch square piece is cut out of the sheet prepared from each of the 5 batches and the squares are placed in an oven which is held at a temperature of 195° C. The color of each square is observed through a glass aperture and recorded at 5 minute intervals after the square has been in the oven for 30 minutes. The results are set down in Table I. Observation is discontinued after the resin becomes dark brown in color. In Table I, the stabilizers which are used in each batch are designated as A, B, C, D, and E. These stabilizers are prepared by reacting one mole of dibutyltin oxide with the designated amount of the following mercaptans:

A. 1 mole of α,α'-dimercapto-p-xylene. (This stabilizer was the product of Example 1)
B. 2 moles of

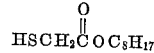

C. 2 moles of $HSC_{12}H_{25}$
D. 1 mole of $HS(CH_2)_2SH$
E. 1 mole of $HS(CH_2)_4SH$ The stabilizers A, D, and E were polymeric products.

TABLE I

| Minutes in Oven at 195° C. | Stabilizer | | | | |
|---|---|---|---|---|---|
| | A | B | C | D | E |
| 30 | Very pale yellow. | Very pale yellow. | Pale yellow. | Very pale yellow. | Pale yellow. |
| 35 | do | Pale yellow | Dark yellow | Yellow | Yellow. |
| 40 | do | do | Brown | Dark yellow | Do. |
| 45 | do | Dark yellow | Dark brown | do | Brown. |
| 50 | do | Dark brown | | Dark brown | Dark brown. |
| 55 | do | | | | |
| 60 | Pale yellow | | | | |
| 65 | Yellow | | | | |
| 70 | Dark yellow | | | | |
| 75 | Dark brown | | | | |

From the above table, it is evident that a tin dimercaptide prepared in accordance with this invention is much more effective in the stabilization of polyvinylchloride than is an equivalent amount of a conventional monomeric tin dimercaptide, such as B or C or of an equivalent amount of a polymeric tin dimercaptide such as D or E.

EXAMPLE 7

*Part A.—Preparation of dimercaptomethyl m-xylene*

To a liter flask equipped with an agitator and a condenser are charged m-xylene (742 g.; 7 moles), concentrated HCl (1729 g.; 17.5 moles), and paraformaldehyde (630 g.; 21 moles). The mixture is heated to 65–70° C. and dry HCl gas is bubbled through the reaction mixture. The temperature of the reaction mixture is held between 65 and 75° C. until the oily layer of product, dichloromethyl m-xylene, reaches a melting point of 70° C. The dichloromethyl m-xylene layer is then separated, washed twice with concentrated HCl, dried and distilled at a pressure of 5 mm. of mercury. A 75 to 80 percent yield of product is obtained. Percent chloride calculated for $C_{10}H_{12}Cl_2$, 34.9; found, 34.8.

To a 2 liter, 3 neck flask equipped with a dropping funnel, an agitator and a condenser are charged dichloromethyl m-xylene (204 g.; 1 mole), thiourea (167 g.; 2.2 moles) and water. This mixture is agitated, heated to 100° C. and digested for about 30 minutes. At this time, the mixture is in solution. Heating is then discontinued and a 50% aqueous solution of NaOH (176 g.; 2.2 moles) is added through the dropping funnel. Sufficient HCl is then added to acidify the reaction mixture. Agitation is discontinued and separation is obtained. The brine layer is drawn off and the mercaptan layer is charged to a distillation flask. It is distilled at a reduced pressure of 1 mm. of mercury and a temperature of 115° C.–125° C. The product, dimercaptomethyl m-xylene, having a melting point of 34–37° C., is obtained in an 84–86% yield. Percent sulfur calculated for $C_{10}H_{14}S_2$, 32.3; found 32.2.

*Part B.—Preparation of dibutyltin dimercaptide of dimercaptomethyl m-xylene*

To a 2 liter flask, equipped with a dropping funnel, an agitator and a distillation head are charged benzene (600 g.), water (341 g.) and dimercaptomethyl m-xylene (198 g.; 1 mole). The mixture is stirred and NaOH (154 g.) as a 50% aqueous solution is added. Dibutyltin dichloride (303.8 g.; 1 mole) is slowly added through the dropping funnel. An exothermic reaction occurs which brings the mixture to reflux. Additional 50% NaOH is added dropwise until a pH of about 9 is obtained. The brine layer is drawn off and the benzene solution of the product, the dibutyltin derivative of dimercaptomethyl m-xylene, is dried and filtered. The benzene is removed by distillation under vacuum and the product remains as a clear, viscous liquid. Percent sulfur calculated, 14.9; found 14.9. Percent tin calculated, 27.7; found, 27.5.

The product is milled with Geon 103 EP in an amount of 2% by weight of the resin for 5 minutes on a 3 inch mill. A piece of the milled resin is placed in an oven heated to a temperature of 196° C. The material is observed to discolor after 74 minutes.

EXAMPLE 8

Dimercaptomethyl-m-xylene (39.6 g.; 0.2 mole) is heated to 100° C. Dibutyltin oxide (49.8 g.; 0.2 mole) is then added with stirring. This mixture is heated to 160° C. to remove any remaining water. A clear, viscous reaction product is thus obtained. Percent sulfur calculated, 14.9; found, 14.8. Percent tin calculated, 27.7; found, 27.6. This product is milled with Geon 103 EP in an amount of 2% by weight of the resin for 5 minutes on a 3 inch mill. A piece of the milled resin is placed in an oven heated to a temperature of 196° C. The material is observed to turn brown after 81 minutes in the oven.

EXAMPLE 9

*Part A.—Preparation of dimercaptomethyl pseudocumene*

To a 5 liter flask equipped with a mechanical stirrer and a condenser are charged pseudocumene (840 g.; 7 moles), concentrated HCl (1729 g.; 17.5 moles) and paraformaldehyde (630 g.; 21 moles). The mixture is heated to 65°–70° C., and dry HCl gas is introduced beneath the surface with agitation. The temperature is maintained at 65°–70° C. until the oily layer of product, dichloromethyl pseudocumene, reaches a melting point of 60° C. This product is then separated, washed twice with concentrated HCl, dried and distilled at a pressure of 5 mm. of mercury. A 75–80 percent yield is obtained. Percent chloride calculated for $C_{11}H_{14}Cl_2$, 32.71; found, 32.6.

To a 2 liter, 3 neck flask equipped with a dropping funnel, a mechanical stirrer and a condenser are charged thiourea (167 g.; 2.2 moles) and 400 grams of water. The mixture is heated to 70° C. and dichloromethyl pseudocumene (216 g.; 1 mole) is added. The mixture is then heated to 100° C. After digesting for 30 minutes, the mixture is in a single phase. Heating is discontinued and NaOH (176 g.; 2.2 moles) as a 50% aqueous solution is added through the dropping funnel. Sufficient concentrated HCl is then added to acidify the reaction mixture. The oily layer of mercaptan is separated from the brine layer by means of a separatory funnel. The crude mercaptan is distilled at a pressure of 1 mm. of mercury to give dimercaptomethyl pseudocumene in an 85 percent yield. Percent sulfur calculated for $C_{11}H_{16}S_2$, 30.18; found, 30.1.

*Part B.—Preparation of dibutyltin dimercaptide dimercaptomethyl pseudocumene*

To a 2 liter flask, equipped with a funnel, a mechanical stirrer and a distillation head, are charged benzene (600 grams), water (341 grams) and dimercaptomethyl pseudocumene (212 g.; 1 mole) with agitation. There are then added 154 grams of NaOH as a 50 percent aqueous solution. Dibutyltin dichloride (303.8 g.; 1 mole) is added slowly through a dropping funnel. An exothermic reaction occurs which brings the reaction mixture to reflux. The temperature is held at reflux while sufficient additional 50% NaOH is added dropwise to bring the pH of the reaction mixture to about 9. The brine layer is drawn off and the layer containing the product, the dibutyltin dimercaptide of dimercaptomethyl pseudocumene, is dried, filtered and distilled at reduced pressure to remove the benzene. The product remains as a clear, viscous liquid. Percent sulfur calculated, 14.45; found, 14.4. Percent tin calculated, 26.79; found, 26.6. This product is milled with Geon 103 EP in an amount of 2% by weight of the resin for 5 minutes on a 3 inch mill. A piece of the milled resin is placed in an oven heated to a temperature of 196° C. The material is observed to discolor after 74 minutes.

EXAMPLE 10

Replacement of pseudocumene in Example 9 by mesitylene leads to dimercaptomethyl mesitylene after chloromethylation and reaction with thiourea as in Example 9. To 212 grams (1 mole) of dimercaptomethyl mesitylene is added slowly with stirring and heating 249 g. (1 mole) of dibutyltin oxide. Water of reaction is removed by heating the product to 130° C. under a vacuum of 10 mm. The dibutyltin derivative of dimercaptomethyl mesitylene remains as a viscous liquid.

EXAMPLE 11

Replacement of the α,α'-dimercapto-p-xylene in Example 1 with an equivalent molar amount of α,α'-dimercapto-o-xylene, α,α'-dimercapto-m-xylene, 1,2,3-trimercaptomethylbenzene, 1,2,4-trimercaptomethylbenzene, 1,2,4,5-tetramercaptomethyl-benzene, 1,4-di(α-mercaptoethyl) benzene, 1-chloro-2,3-dimercaptomethylbenzene, 1-ethyl - 2,5-dimercaptomethylbenzene, 1,3,5-tribromo-2,4,6-tri(α-mercaptoethyl) benzene, 2,4-dimercaptomethyltoluene, 2,4-dimercaptomethyl-3-bromotoluene, 1,4 - dimercaptomethylnaphthalene, 1,2-di(β-mercaptooctyl) benzene, and 1,4-di(α-mercaptohexyl) benzene, respectively, results in the formation of the corresponding dibutyltin dimercaptides.

EXAMPLE 12

Replacement of the dibutyltin dichloride in Example 8 with an equivalent molar amount of dilauryltin dibromide, difurfuryltin diiodide, diethyltin dibromide and dimethyltin diiodide, respectively, results in the production of the corresponding diorganotin dimercaptides.

EXAMPLE 13

Replacement of the dibutyltin oxide in Example 1 with an equivalent molar amount of dimethyltin diacetate, dipropyltin dimethoxide, dioctyltin oxide, didodecyltin oxide, dicyclohexyltin dihydroxide, di(2-butenyl) tin oxide and di-t-butyltin dihydroxide, respectively, results in the formation of the corresponding diorganotin p-xylene α,α'-dimercaptides.

We claim:
1. A heat stable vinyl halide resin composition containing a stabilizing amount of a diorgano tetravalent tin dimercaptide of a polymercapto compound having the formula

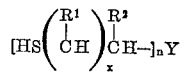

wherein Y is a member selected from the group consisting of an aromatic hydrocarbon radical, an alkoxy substituted aromatic hydrocarbon radical and a halogenated aromatic hydrocarbon radical, each of said

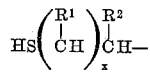

groups being attached to a nuclear carbon atom of said Y radical, $R^1$ and $R^2$ are members selected from the group consisting of hydrogen and alkyl radicals containing from 1 to 18 carbon atoms and the total of $R^1$ and $R^2$ does not exceed 20 carbon atoms, $x$ has a value of from 0 to 1 and $n$ is a whole integer from 2 to 4.

2. A heat stable resin composition comprising a vinyl chloride resin and a stabilizing amount of the dibutyl tetravalent tin dimercaptide of dimercaptomethyl-m-xylene.

3. A heat stable resin composition comprising a vinyl chloride resin and a stabilizing amount of the dibutyl tetravalent tin dimercaptide of dimercaptomethyl pseudocumene.

4. A heat stable resin composition comprising a vinyl chloride resin and a stabilizing amount of the dibutyl tetravalent tin dimercaptide of dimercaptomethyl mesitylene.

5. A heat stable resin composition comprising polyvinylchloride resin and a stabilizing amount of a dialkyltin xylene α,α'-dimercaptide in which the alkyl group contains from 1 to 18 carbon atoms.

References Cited by the Examiner

UNITED STATES PATENTS

| | | | |
|---|---|---|---|
| 2,726,227 | 12/55 | Lustner et al. | 260—45.75 |
| 2,731,484 | 12/55 | Best | 260—45.75 |

FOREIGN PATENTS

| | | |
|---|---|---|
| 723,296 | 2/55 | Great Britain. |
| 1,138,451 | 1/57 | France. |

LEON J. BERCOVITZ, *Primary Examiner.*